Sept. 24, 1940.   J. H. VAN UUM   2,215,656
SPRING CLIP DEVICE
Filed May 29, 1937

INVENTOR.
JOHN H VAN UUM
BY
HIS ATTORNEY.

Patented Sept. 24, 1940

2,215,656

UNITED STATES PATENT OFFICE 2,215,656

SPRING CLIP DEVICE

John H. Van Uum, Lakewood, Ohio

Application May 29, 1937, Serial No. 145,474

4 Claims. (Cl. 85—5)

This invention relates to snap fasteners or spring clips of the general character used for connecting members such as hollow molding, bead trim, and the like to apertured supports such as automobile bodies.

One of the objects of the present invention is to provide a clip for connecting such a member to an apertured support and which may be installed in place in the support preparatory to snapping the member to be supported into engagement with the clip.

Another object is to provide a clip for this purpose in which the head portions of the clip which engage and secure the bead trim or other supported member are positively spaced from the support so that they may be more readily cooperated with the supported member.

A more specific but equally important object is to provide in such a clip a plurality of head portions, each positively spaced slightly different distances from the outer face of the supporting structure so that differences in thickness of the member to be supported are compensated for and firm inter-locking of the clip with the supported member is provided in at least one point on each head portion under all circumstances.

Another object is to provide a clip in which the shank portion received in the aperture of the support is in the form of a closed loop so that the spring effect of the metal is utilized to provide a more firm engagement with the support.

Another oject is to provide a clip having a plurality of head portions for not only forming land shoulders for limiting the amount of insertion of the clip, but part of which may engage the inner edges of the inturned flanges of the trim member and thus position the trim member accurately with respect to the clip in the plane of the outer surface of the support.

Other objects and advantages will become apparent from the following specification wherein reference is made to the drawing, in which.

Figure 1:
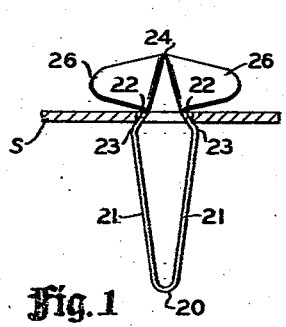
Fig. 1 is an end elevation of a clip embodying the principles of the present invention, and a portion of the support in which the clip is installed.
Figure 2:
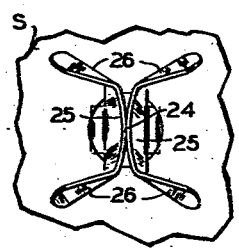
Figs. 2 and 3 are a plan view and side elevation, respectively, of the clip and support illustrated in Fig. 1.
Figure 3:
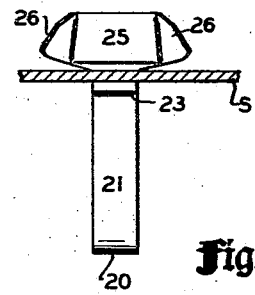

Referring to Figs. 1 to 5, a clip embodying the principles of the present invention is illustrated, the clip comprising a single piece of metal having a nose portion 20 with leg portions 21 divergent therefrom partway of their length and then convergent, as indicated at 22 to provide sloping locking shoulders 23 for engagement with the under side of the support S. The convergent portions 22 abut each other at their free ends, as indicated at 24, so as to form a substantially closed loop for developing the full spring effect of the metal for holding the clip in the aperture of the support S. The convergent portions 22 of the legs 21 are provided with widened head portions 25 integral therewith and extending generally parallel to the plane of the associated convergent portions. Each of the head portions 25 has free end portions or fingers 26 which are bent at an angle thereto, and twisted so as to converge in a direction away from the nose portion of the clip. The fingers 26 are preferably the same in size and shape so that they define a square. Due to the convergence of the head portions and the twisting of the fingers 26, the lower edge of each finger 26 extends upwardly from the support, that is, generally away from the nose 20, and outwardly from the aperture, or from the head portions 25, on a gradual slope.

Figure 4:
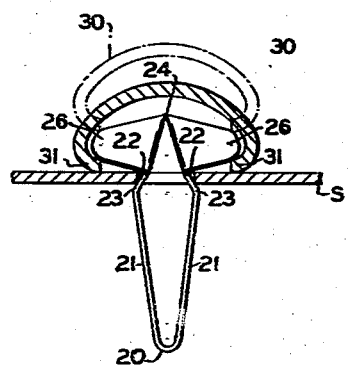
Fig. 4 is a view of the clip illustrated in Fig. 1, showing its relation to the supporting structure and supported member.
Figure 5:
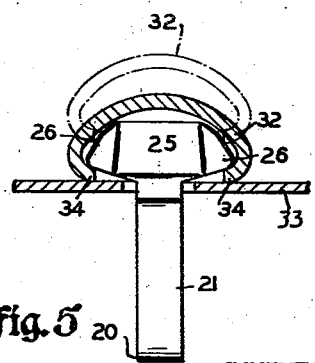
Fig. 5 is a view of the clip illustrated in Fig. 1 turned 90° to the position illustrated in Fig. 4 and showing a different manner of cooperation with the supported member.

For accommodating trim members of different thicknesses, one finger 26 of each head portion is disposed so that its lower edge is slightly differently spaced from the outer surface of the support than the other finger 26 of the same head. The diagonally opposite fingers of the other head portion 25 are similarly arranged. Thus variations in thickness in stock from which the trim T is formed and also irregularities in the flanges 31 and burrs thereon, resulting from processes of manufacture, do not destroy the effectiveness of the clip. Instead, the different clearances thus afforded accommodate and compensate for such irregularities in the trim member. The clip is inserted in the aperture of the support in the usual manner, the head portions 25 providing proper spacing lands for engagement with the outer surface of the support S to space the fingers 26 outwardly from the outer surface of the support so that a trim member may be snapped into engagement with the fingers after the clip is installed in the support. The trim member, such as indicated at 30, and which has inturned flanges 31, is snapped into place on the fingers 26. For effecting this engagement, the member 30 is pressed firmly towards the support which flexes the fingers 26 relatively inwardly and permits relative passage of the flanges 31. Thereupon the fingers reflex to engage the inner surfaces of the flanges 31, as illustrated in Fig. 4. Again, due to the fact that one pair of diagonally opposite fingers are spaced slightly differently from the support than the other pair, compensation is made for differences in thickness in the gauge of the trim member and gripping of the trim member at at least one point at each side of the slot therein is assured. The clip illustrated in Figs. 1 to 4 may be installed with the fingers 26 of one head portion engaging one side of the trim member and the fingers 26 of the other head portion engaging the other side of the trim member, as illustrated in Fig. 4. Since, however, as described, the fingers are of equal length and define a square, the clip may be associated with the same trim member though the clip is rotated 90°, thus disposing one finger of each head at opposite sides of the trim member. The clip in this installed position is illustrated in Fig. 5, wherein the trim member 32 is secured to the support 33, one finger of each head portion engaging each flange 34. The clips illustrated in Figs. 4 and 5 are the same except for different positions of installation and the same parts are designated by the same numerals.

It should be noted that the arms 26 are oblique to the vertical axis of the head. Furthermore, each arm 26 is inclined away from the arms adjacent thereto. Thus, when a trim member is forced downwardly onto the arms, each arm moves away from one arm adjacent to it and toward the other arm adjacent to it concurrently, the outer end of each arm moving in a generally circumferential path relative to the central portion of the head for effecting this change in position of the arms relative to each other.

It is apparent from the foregoing description that a simple and effective clip for the purposes recited is provided and that in the form of clip illustrated in Figs. 1 to 5 suitable sloping cam surfaces are provided on the fingers merely by the slight twisting of the metal of which they are formed.

Having thus described my invention, I claim,

1. A spring clip for securing to a support a hollow member having an opening in one face and with inturned parallel flanges therealong, said clip comprising a shank portion including two spaced legs for engaging the support and a head portion for snap-fastening engagement with the hollow member, said head portion having an imaginary axis normal to the support and passing through the length of the shank, said head portion being in two parts and said parts being carried on the legs, respectively, and said parts being in abutting relation to each other adjacent said axis, and at least four approximately normally extending and relatively diverging arms of spring metal adapted to flex circumferentially relative to said axis, said arms being arranged in pairs and the pairs being carried on the head parts, respectively, each arm having a free end edge portion extending obliquely relative to the axis of the head and oppositely inclined relative to the end edge portions of each of the arms adjacent to it, said end edge portions being contoured to provide camming surfaces adapted for concurrent engagement with the inturned flanges of the hollow member when the flanges are moved toward the support in contact with said end edge portions, whereby the flanges can flex the arms and be locked relative to the support upon reflexure of the arms.

2. A spring clip for securing to a support a hollow member having an opening in one face and with inturned parallel flanges therealong, said clip comprising a shank portion including a pair of spaced legs for engaging the support and a head portion for snap-fastening engagement with the hollow member, said head portion having an imaginary axis normal to the support and passing through the length of the shank, said head portion being in two parts and said parts being carried on the legs, respectively, and said parts being in abutting relation to each other adjacent said axis, and at least four elongated, relatively diverging arms of flat spring metal extending approximately normal thereto, said arms being arranged in pairs and the pairs being carried on the head parts, respectively, the major faces of each of the free end portions of the arms being oblique to the axis and relatively turned so that two pairs of adjacent major faces converge away from the support and two pairs of adjacent major faces converge toward the support, end edge portions of the arms remotely of the support sloping outwardly toward the extremities of respective arms to provide camming surfaces for engagement with the inturned flanges of the hollow member when the flanges are moved toward the support in contact with said sloping end edge portions.

3. A spring clip for securing to a support a hollow member having an opening in one face and with inturned parallel flanges therealong, said clip comprising a shank portion including a pair of legs for engaging the support and a head portion for snap-fastening engagement with the hollow member, said head portion having an imaginary axis normal to the support and passing through the length of the shank, said head portion being in two parts and said parts being carried on the legs, respectively, and said parts being in abutting relation to each other adjacent said axis, and at least four elongated, relatively diverging arms of spring metal extending approximately normal thereto adapted to flex circumferentially relative to said axis, said arms being arranged in pairs and the pairs being carried on the head parts, respectively, each arm having a free end edge portion extending obliquely to the axis of the head and oppositely inclined relative to the end edge portions of each of the arms adjacent to it, each arm having an end edge portion remote from the support sloping outwardly toward the outer extremity of the arm to provide camming surfaces for engagement with the inturned flanges of the hollow member when the flanges are moved toward the support in simultaneous contact with said sloping end edge portions, and each arm having an edge portion, nearer the support than the outer extremity of the arm, sloping inwardly along the arm from its extremity, whereby to secure the flanges of the hollow member by engagement with edges of said flanges which are remote from the support.

4. A spring clip for the purpose described comprising a single piece of flat spring stock having a shank portion in the form of a loop providing spaced legs adapted for spring engagement with an opening in a support, and a head portion the central region of which, adjacent the upper end of the shank, comprises upwardly converging and abutting extensions of the legs, the lateral edges of said extensions having respective relatively diverging arms, the free end edges of which arms are oblique to an imaginary axis of the loop which passes between the legs lengthwise thereof, each end edge being inclined in a different direction from the end edges of the adjacent arms, the upper portions of each end edge sloping outwardly of the respective arm to provide a camming surface for engagement with a member to be secured adjacent the said support.

JOHN H. VAN UUM.